United States Patent
Courcimeaux

(10) Patent No.: US 12,227,211 B2
(45) Date of Patent: Feb. 18, 2025

(54) MOUNTING SYSTEM AND DEVICE FOR INSTALLING AT LEAST ONE LINING ELEMENT IN A TRANSPORT VEHICLE, AND CORRESPONDING TRANSPORT VEHICLE

(71) Applicant: SpeedInnov, Paris (FR)

(72) Inventor: Eric Courcimeaux, Dompierre sur Mer (FR)

(73) Assignee: SpeedInnov, Paris (FR)

(*) Notice: Subject to any disclaimer, the term of this patent is extended or adjusted under 35 U.S.C. 154(b) by 909 days.

(21) Appl. No.: 17/319,801

(22) Filed: May 13, 2021

(65) Prior Publication Data

US 2021/0362753 A1  Nov. 25, 2021

(30) Foreign Application Priority Data

May 19, 2020  (FR) ..................................... 20 05037

(51) Int. Cl.
 *B61D 17/00*  (2006.01)
(52) U.S. Cl.
 CPC ................................... *B61D 17/00* (2013.01)
(58) Field of Classification Search
 CPC .... B61D 17/00; B61D 17/005; B61D 17/043; B61D 17/046; B61D 17/048; B61D 17/06; B61D 17/08
 See application file for complete search history.

(56) References Cited

U.S. PATENT DOCUMENTS

| 2014/0001322 A1 | 1/2014 | Joyce et al. |
| 2014/0263895 A1 | 9/2014 | Dickenson et al. |
| 2015/0158437 A1 | 6/2015 | Tuma |

FOREIGN PATENT DOCUMENTS

| FR | 2868135 A1 | 9/2005 |
| JP | 57-31250 U | * 2/1982 |
| JP | S57 31250 U | 2/1982 |
| JP | H07 329655 A | 12/1995 |
| WO | 2019/115443 A1 | 6/2019 |

OTHER PUBLICATIONS

French Search Report issued for French Patent Application No. FR 2005037, dated Nov. 9, 2020 in 2 pages.

* cited by examiner

*Primary Examiner* — Robert J McCarry, Jr.
(74) *Attorney, Agent, or Firm* — KNOBBE, MARTENS, OLSON & BEAR LLP

(57) ABSTRACT

A mounting device includes a front part equipped with first connector for connecting directly to a liner suitable to be installed in a vehicle, or to an intermediate connection device connected to the liner, and a back part that extends from the front part, in the direction opposite the first connector, and includes second connector that are elastically deformable and are adapted to engage, in an adjustable position, along a support structure of the transport vehicle. The front part includes a first face that is substantially flat, onto which is fastened a first layer incorporating the first connector, and the back part comprises a first arm and a second arm, which extend from the two opposite ends of the first face and which converge toward one another.

9 Claims, 3 Drawing Sheets

MOUNTING SYSTEM AND DEVICE FOR INSTALLING AT LEAST ONE LINING ELEMENT IN A TRANSPORT VEHICLE, AND CORRESPONDING TRANSPORT VEHICLE

CROSS-REFERENCE TO RELATED APPLICATION

This application claims priority to French Patent Application No. 20 05037 filed on May 19, 2020, the disclosure of which including the specification, the drawings, and the claims is hereby incorporated by reference in its entirety.

FIELD OF THE INVENTION

This invention relates to a mounting system and device for installing at least one lining element in a transport vehicle, and corresponding transport vehicle, particularly a railway transport vehicle.

BACKGROUND OF THE INVENTION

It is well known that, in the field of transport systems, vehicles are usually provided with lining elements, such as side cover panels, which are installed inside the vehicles by fastening them to the structure of those same vehicles.

In the current state of the art, known solutions for installing lining elements are not fully satisfactory.

For instance, in the field of railway transport, the fastening of side panels is generally done blind, and the standard solution consists of fastening a certain number of supports by screw/nut in a rail that forms part of the railcar support structure.

In this solution, each support to be fastened must be accurately positioned in order to end up facing the fastening area on the side lining, and the accurate positioning of the supports across the full length of the installation face is necessarily complex.

Consequently, the time needed to position and fasten the supports is very long, and the work is tedious and expensive.

SUMMARY OF THE INVENTION

The main goal of the present invention is to provide a solution that offers improvements over the known prior art and in particular to substantially simplify the mounting and installation of lining elements in all types of transport vehicles, particularly in railway transport vehicles.

This goal is achieved by a mounting device for installing at least one lining element in a transport vehicle, comprising a front part equipped with first coupling means for connecting directly to the lining element or to an intermediate connection device connected to the lining element, and a back part that extends from the first front part in the direction opposite to the first coupling means and comprises second coupling means that are elastically deformable and adapted to engage, in an adjustable position, along a support structure of the transport vehicle, wherein the front part comprises a first face, which is substantially flat, onto which is fastened a first layer incorporating the first coupling means, and wherein the back part comprises a first arm and a second arm that extend from the two opposite ends of the first face and converge one toward the other.

According to advantageous but not mandatory aspects of the invention, such a mounting device may incorporate one or more of the following features, taken in any combination that is technically feasible:

the device comprises a monolithic body which is clip-shaped and incorporates the front part and the back part;

the monolithic body is made of a metallic or alternatively plastic material;

the first layer incorporating the first coupling means comprises male mechanical coupling means;

the first layer comprises a strip of fabric incorporating hooks;

the first layer comprises an adhesive tape having coupling heads configured in a mushroom shape;

the first layer incorporating the first coupling means comprises female mechanical coupling means;

the first layer comprises a strip of fabric incorporating loops;

the first coupling means comprise, in addition or as an alternative to the mechanical coupling means, chemical coupling means.

The aforementioned goal of the present invention is also achieved by a mounting system for installing at least one lining element in a transport vehicle, wherein it comprises:

a mounting device for installing the at least one lining element in the transport vehicle, the mounting device comprising a front part equipped with first coupling means, and a back part that extends from the first front part in the direction opposite to the first coupling means and comprises second coupling means that are elastically deformable and adapted to engage, in an adjustable position, along a support structure of the transport vehicle, wherein the front part comprises a first face, which is substantially flat, onto which is fastened a first layer incorporating the first coupling means, and wherein the back part comprises a first arm and a second arm that extend from the two opposite ends of the first face and converge one toward the other; and an intermediate connection device comprising a first part intended to be connected to the lining element, and a second part that extends from the first part, and is equipped with additional coupling means adapted to couple with the first coupling means.

According to advantageous but not mandatory aspects of the invention, such a mounting system may incorporate one or more of the following features, taken in any combination that is technically feasible:

the second part of the intermediate connection device comprises a second face, which is substantially flat, onto which is fastened a second layer incorporating additional coupling means, and the first part comprises a third arm and a fourth arm that extend from two opposite ends of the other face and are substantially configured in an L shape;

the first layer fastened onto the first face of the mounting device covers a surface area greater than that covered by the second layer fastened onto the second face of the intermediate connection device;

the second layer incorporating the additional coupling means comprises male mechanical coupling means;

the second layer comprises a strip of fabric incorporating hooks;

the second layer comprises an adhesive tape having coupling heads configured in a mushroom shape;

the second layer incorporating the additional coupling means comprises female mechanical coupling means;

the second layer comprises a strip of fabric incorporating loops;

the additional coupling means comprise, in addition or as an alternative to the mechanical coupling means, chemical coupling means.

Further, the aforementioned goal of the present invention is also achieved by a transport vehicle, particularly a railway vehicle, wherein the transport vehicle comprises at least one mounting device for installing at least one lining element in the transport vehicle, the at least one mounting device comprising a front part equipped with first coupling means for connecting to the lining element or to an intermediate connection device connected to the lining element, and a back part that extends from the first front part in the direction opposite to the first coupling means, and comprises second coupling means that are elastically deformable and adapted to engage, in an adjustable position, along a support structure of the transport vehicle, wherein the front part comprises a first face, which is substantially flat, onto which is fastened a first layer incorporating the first coupling means, and wherein the back part comprises a first arm and a second arm that extend from the two opposite ends of the first face and converge one toward the other.

Finally, the aforementioned goal of the present invention is also achieved by a transport vehicle, particularly a railway vehicle, wherein the transport vehicle comprises a mounting system for installing at least one lining element in the transport vehicle, wherein the mounting system comprises:

a mounting device for installing the at least one lining element in the transport vehicle, the mounting device comprising a front part equipped with first coupling means, and a back part that extends from the first front part in the direction opposite to the first coupling means and comprises second coupling means that are elastically deformable and adapted to engage, in an adjustable position, along a support structure of the transport vehicle, wherein the front part comprises a first face, which is substantially flat, onto which is fastened a first layer incorporating the first coupling means, and wherein the back part comprises a first arm and a second arm that extend from the two opposite ends of the first face and converge one toward the other; and an intermediate connection device comprising a first part intended to be connected to the lining element, and a second part that extends from the first part, and is equipped with additional coupling means adapted to couple with the first coupling means.

BRIEF DESCRIPTION OF THE DRAWINGS

Other aspects and advantages of the invention will become apparent upon reading the following description, given only as an example and referencing the attached drawings, in which.

DETAILED DESCRIPTION OF THE PREFERRED EMBODIMENTS

It should be noted that in the detailed description that follows, components that are identical or similar from a structural and/or functional perspective have the same reference numbers, whether or not they are represented in the various embodiments given in this description.

It should also be noted that in order to clearly and concisely describe the present invention, the drawings are not necessarily to scale, and that certain features may be presented schematically.

Furthermore, when the term "adapted" or "arranged" or "configured" is used here with reference to any component as a whole, or any part of a component, or a combination of components, that term must be understood to signify and encompass the structure, and/or configuration, and/or shape, and/or positioning of the component or part designated by that term.

Figure 1:
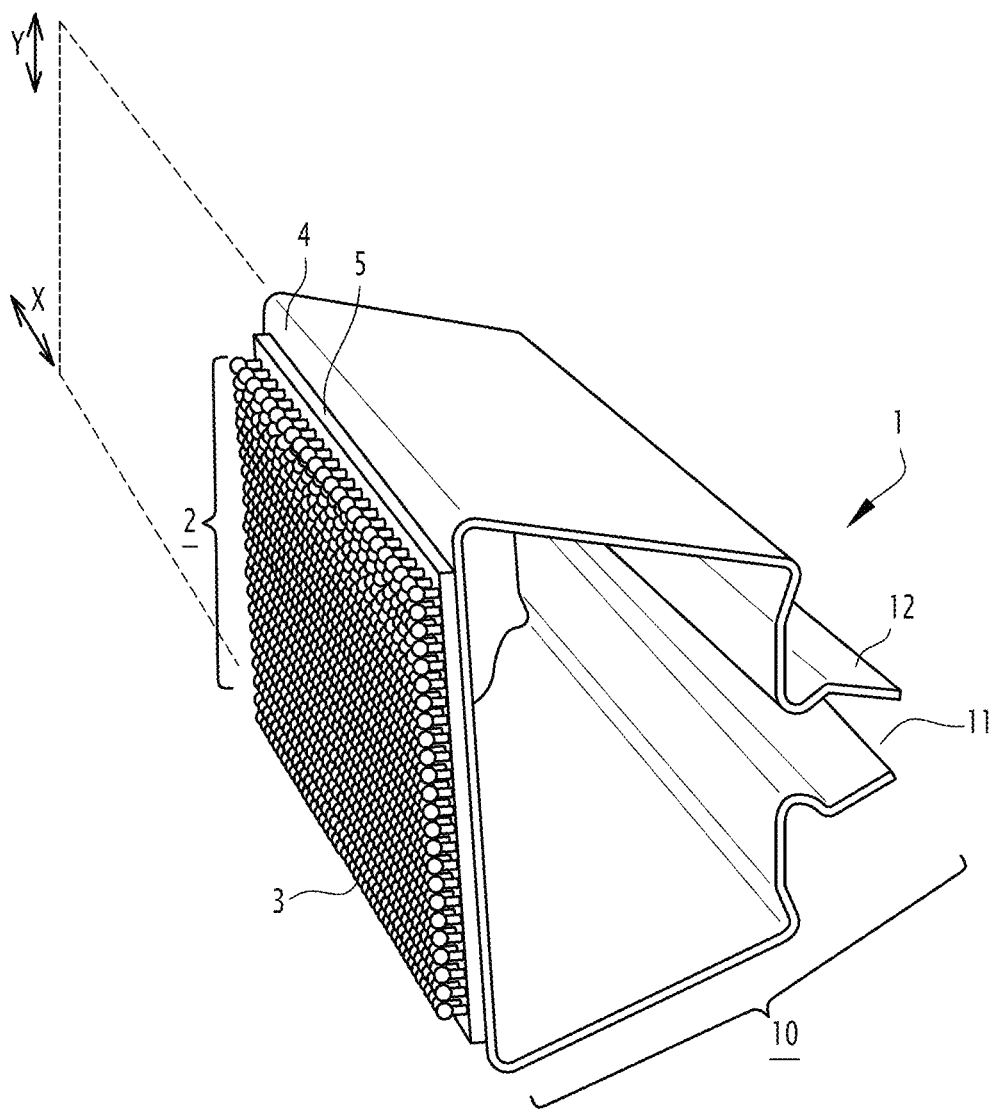
FIG. 1 is a perspective view illustrating one possible example embodiment of a mounting device according to the present invention.
Figure 2:
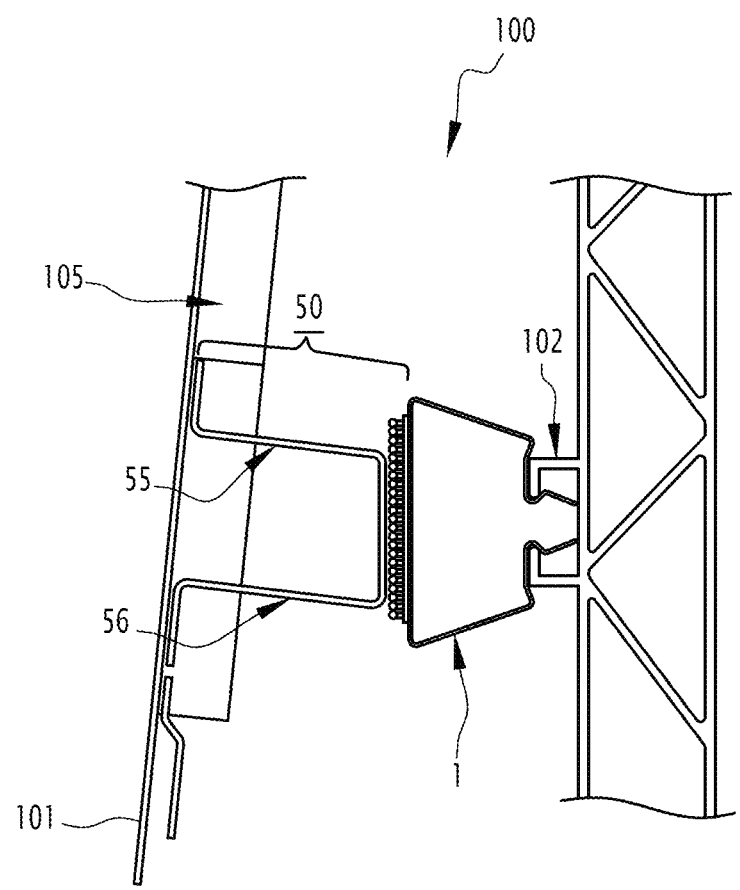
FIG. 2 is a side view illustrating one possible example embodiment of a mounting system according to the present invention, using the mounting device illustrated in FIG. 1.
Figure 3:
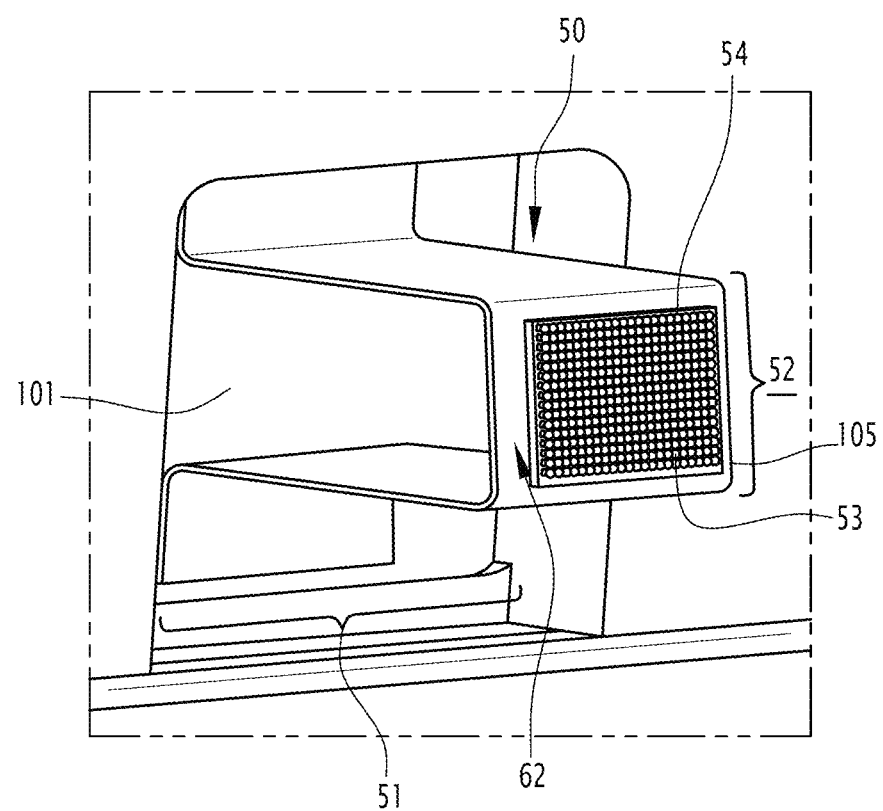
FIG. 3 is a detailed view illustrating an intermediate connection device connected to a lining panel and used in the system illustrated in FIG. 2.

FIG. 1 schematically depicts a mounting device, designated by reference number 1, for installing in a transport vehicle (not depicted) at least one lining element, such as a panel, designated by reference number 101 in FIGS. 2 and 3.

The definition of "transport vehicle" used here must be interpreted in the broadest possible sense, meaning that it includes any type of transport vehicle, and may therefore be considered to cover either preferably railway vehicles, such as surface trains, subways, or trams, or additionally trucks, buses, and similar vehicles.

In particular, the device 1 comprises: a front part 2, equipped with first coupling means (i.e. connector) 3 for direct connection to the lining element (e.g. liner) 101, or via an intermediate connection device 50 connected to the lining element 101, as depicted in the example illustrated in FIG. 2; and a back part 10 that extends from the first front part 2, in the direction opposite the first coupling means 3, and comprising second coupling means 11, 12 that are elastically deformable and are adapted to engage, in an adjustable position, along a support structure 102 of the transport vehicle.

The support structure 102 may comprise, for instance, a face rail, as depicted in FIG. 2, or other elements, such as a folded metal sheet with oblong holes, etc.

According to one embodiment of the device 1, the front part 2 comprises a first face 4 that is substantially flat, onto which is fastened, for instance bonded, a first layer 5 incorporating the first coupling means 3, and the back part 10 comprises a first arm 11 and a second arm 12, for instance wave-shaped, which extend from the two opposite ends of the face 4 and which converge toward one another.

In particular, according to one possible embodiment, the device 1 comprises a monolithic body which is clip-shaped and incorporates the front part 2 and the back part 10.

The monolithic body forming the device 1 may be made of a metallic material.

Alternatively, the monolithic body may be made of a plastic material in order to enable, if necessary, the breaking of the thermal bridge that may be formed between the support structure 102 and the intermediate device 50 and/or the lining element 101 when they are all made of a metallic material.

According to one possible embodiment, the first layer 5 incorporating the first coupling means 3 comprises male mechanical coupling means.

In particular, the layer 5 comprises a strip of fabric incorporating hooks, and may be formed, for instance, by a strip of "Velcro"-type material.

According to another possible embodiment, the first layer 5 incorporating the first coupling means 3 comprises an adhesive tape incorporating coupling heads configured in a mushroom shape, and may be formed, for instance, by adhesive tape of the "dual lock" type sold by the company 3M.

In one variant, the first layer 5 incorporating the first coupling means 3 comprises female mechanical coupling means.

In this variant, the first layer 5 comprises a strip of fabric comprising loops, and may be formed, for instance, by a strip of "Velcro"-type material.

In one possible embodiment of the mounting device 1 according to the present invention, the first coupling means 3 may comprise, in addition or as an alternative to the mechanical coupling means, chemical coupling means such as a bonding agent or an adhesive material in general.

The device 1 described above may advantageously be used in a mounting system for installing at least one lining element 101 in a transport vehicle, one example embodiment of which is depicted in FIG. 2 and indicated by the reference number 100.

According to the embodiment depicted in FIG. 2, the mounting system 100 comprises, in addition to the mounting device 100, an intermediate connection device 50.

As depicted in FIGS. 2 and 3, the intermediate connection device 50 comprises a first part 51 intended to be connected to the lining element 101, such as by being screwed in, and a second part 52 that extends from the first part 51, and is equipped with additional coupling means 53 adapted to couple with the first coupling means 3 of the mounting device 1.

In particular, in the depicted embodiment, the second part 52 of the intermediate connection device 50 comprises a second face 62, which is substantially flat, onto which is fastened a second layer 54 incorporating additional coupling means 53, and the first part 51 comprises a third arm 55 and a fourth arm 56 that extend from two opposite ends of the second face 62 and are substantially configured in an L shape.

Advantageously, in the mounting system 100 of the present invention, the first layer 5 fastened onto the first face 4 of the mounting device 1 covers a surface area greater than that covered by the second layer 54 fastened onto the second face 62 of the intermediate connection device 50.

In particular, with reference to a virtual plane X-Y parallel to the flat surfaces 4 and 62, the first layer 5 is longer than the second layer 54 along the direction X, and also along the direction Y.

In this way, when the mounting device 1 is connected to the intermediate device 50 or directly to the lining element 101, it is possible to absorb any vertical or longitudinal positioning defects.

The additional coupling means 53 may be mechanical and designed to couple with the first coupling means 3 of the mounting device 1, meaning that if the first coupling means 3 are of the male type, such as by being formed of hooks incorporated into a strip of "Velcro"-type material, then the additional coupling means 53 are of the female type, such as by being formed of loops incorporated into a strip of "Velcro"-type material, or vice versa.

Alternatively, if the first coupling means 3 of the first layer 5 comprise coupling heads configured in a mushroom shape and incorporated into an adhesive tape of the "dual lock" type as mentioned above, the additional coupling means 53 may further comprise coupling heads configured in a mushroom shape and incorporated into another adhesive tape of the same type or a similar one.

Finally, in one possible embodiment of the mounting device 100 according to the present invention, the additional coupling means 53 may comprise, in addition or as an alternative to the mechanical coupling means, chemical coupling means such as a bonding agent or an adhesive material.

It is clear from the above description that the mounting device 1 and the mounting system 100 as well as the corresponding transport vehicle make it possible to achieve the goal of the present invention, because the mounting of the lining elements to be installed in the vehicles is made simpler, is easily adjustable, and with a less expensive, more effective, more accurate, and faster-to-use construction solution.

The device 1 and system 100 that conceived may be susceptible to modifications or variants. For instance, the specific configuration of any part of the devices 1 and 50 described above may be modified provided that it is kept suitable for to carrying out the functions for which it was designed in the context of this invention; the additional coupling means 53 may be fastened directly onto a lining element 101; other elements, such as insulating layers 105, may be installed between the panel 101 and the support rail 102, as depicted in FIGS. 1 and 2, and the intermediate device 50 may be positioned in an open space within the insulating layer 105. All details may furthermore be replaced by technically equivalent elements.

What is claimed is:

1. A mounting device for installing at least one liner in a transport vehicle, comprising a front part, equipped with first connector for connecting directly to the liner or to an intermediate connection device connected to the liner, and a back part that extends from the front part, in a direction opposite to the first connector, and comprises a second connector that is elastically deformable and adapted to engage, in an adjustable position, along a support structure of the transport vehicle, wherein
the front part comprises a first face that is substantially flat, onto which is fastened a first layer incorporating the first connector, and wherein the back part comprises a first arm and a second arm which extend from the two opposite ends of the first face, wherein the first arm and the second arm are separate components, which converge one toward the other.

2. The mounting device according to claim 1, comprising a monolithic body which is clip-shaped and incorporates the front part and the back part.

3. The mounting device according to claim 2, wherein the first layer incorporating the first connector comprises male or female mechanical connector.

4. The mounting device according to claim 3, wherein the first layer comprises a strip of fabric incorporating hooks or an adhesive tape incorporating coupling heads which are mushroom-shaped.

5. The mounting device according to claim 3, wherein the first layer comprises a strip of fabric comprising loops.

6. A mounting system for installing at least one liner in a transport vehicle, comprising the mounting device according to claim 1, and an intermediate connection device comprising a first part intended to be connected to the liner, and a second part that extends from the first part, and is equipped with additional connector adapted to couple with the first connector.

7. The mounting system according to claim 6, wherein the second part of the intermediate connection device comprises a second face which is substantially flat, onto which is fastened a second layer incorporating additional connector, and wherein the first part comprises a third arm and a fourth arm that extend from two opposite ends of the second face and are substantially configured in an L shape.

8. The mounting system according to claim 7, wherein the first layer fastened onto the first face of the mounting device covers a surface area greater than that covered by the second layer fastened onto the second face of the intermediate connection device.

9. A transport vehicle that comprises the mounting system according to claim 6.

* * * * *